US009399255B2

(12) United States Patent
Zoller et al.

(10) Patent No.: US 9,399,255 B2
(45) Date of Patent: Jul. 26, 2016

(54) DEVICE AND METHOD FOR PRODUCING A GREEN COMPACT FROM A POWDERED OR GRANULAR MATERIAL

(75) Inventors: Ansgar Zoller, Goefis (AT); Michael Gruhl, Balzers (LI); Cliff Toldo, Triesen (LI)

(73) Assignee: Hilti Aktiengesellschaft, Schaan (LI)

( * ) Notice: Subject to any disclaimer, the term of this patent is extended or adjusted under 35 U.S.C. 154(b) by 1046 days.

(21) Appl. No.: 13/451,259

(22) Filed: Apr. 19, 2012

(65) Prior Publication Data

US 2012/0267829 A1 Oct. 25, 2012

(30) Foreign Application Priority Data

Apr. 20, 2011 (DE) .......................... 10 2011 007 728

(51) Int. Cl.
*B22F 3/00* (2006.01)
*B22F 3/03* (2006.01)

(52) U.S. Cl.
CPC .. *B22F 3/004* (2013.01); *B22F 3/03* (2013.01)

(58) Field of Classification Search
CPC ............... B22F 3/004; B22F 3/00; B22F 3/02
USPC .................. 141/125, 144–148, 248; 425/150; 419/5, 6
See application file for complete search history.

(56) References Cited

U.S. PATENT DOCUMENTS

| | | | |
|---|---|---|---|
| 2,800,684 A * | 7/1957 | Luthman .................... | B22F 3/03 425/353 |
| 3,752,003 A | 8/1973 | Dunn et al. | |
| 3,995,979 A * | 12/1976 | Fedrigo ..................... | B05B 5/08 118/622 |
| 4,354,811 A * | 10/1982 | Marmo .................. | B30B 11/005 264/40.5 |
| 7,255,139 B2 * | 8/2007 | Tochio ................... | B30B 15/304 141/125 |

FOREIGN PATENT DOCUMENTS

| | | |
|---|---|---|
| DE | 199 03 417 B4 | 8/2000 |
| DE | 102 09 746 A1 | 10/2003 |
| EP | 2 098 317 A1 | 9/2009 |

OTHER PUBLICATIONS

European Search Report dated Oct. 21, 2013, with Statement of Relevancy (Six(6) pages).
German Search Report, dated Dec. 19, 2011, 5 pages.
Chinese Office Action dated Feb. 3, 2015, with English translation (Eighteen (18) pages).

* cited by examiner

*Primary Examiner* — Timothy L Maust
(74) *Attorney, Agent, or Firm* — Crowell & Moring LLP

(57) ABSTRACT

A device and method for producing a green compact from a powdered or granular material by successive application and compression of the material, is disclosed. The device includes a fill shoe, which is filled with the material and is adjustable by an adjusting device, where a first park position is provided for the fill shoe. A matrix having at least one construction chamber is filled with the material layer-by-layer by the fill shoe between a first and second end position. A press having a lower punch and an upper punch, which are adjustable by a height adjustment device, compresses the material applied layer-by-layer in the at least one construction chamber. After filling the construction chamber with the material, the fill shoe is moved out of the second end position into a second park position, where the second park position is different from the first park position.

5 Claims, 3 Drawing Sheets ern patent
DEVICE AND METHOD FOR PRODUCING A GREEN COMPACT FROM A POWDERED OR GRANULAR MATERIAL This application claims the priority of German Patent Document No. 10 2011 007 728.6, filed Apr. 20, 2011, the disclosure of which is expressly incorporated by reference herein.

BACKGROUND AND SUMMARY OF THE INVENTION

The present invention relates to a device for producing a green compact from a powdered or granular material as well as a method for producing a green compact from a powdered or granular material.

Known processing tools like drill bits and circular saw blades are made of a main body which is connected to cutting segments. The cutting segments are connected to the main body by laser welding, for example, and are made of a base zone and a use zone. The area of the cutting segment that is connected to the main body of the processing tool is designated as the base zone and the remaining cutting segment as the use zone. The base zone is made of, for example, a weldable material so the main body and the cutting segments are able to be welded together well. The use zone is made of a basic material and cutting particles that are embedded into the basic material. The cutting particles are designed as diamond particles or other abrasive particles, which are suitable for abrasive processing. The cutting effect is produced by the cutting particles and the basic material serves to fix the cutting particles.

The cutting segments are produced in a two-stage method from powdered or granular materials. In a first stage, a green compact is constructed of material layers lying on top of one another and in a second stage, the green compact is finished in a sintering plant by the effect of temperature and/or pressure. In a first group of manufacturing methods the cutting particles are mixed into the basic material and distributed uniformly in the basic material. The disadvantage is that it is possible for cutting particle nests to form, which reduce the cutting efficiency and the service life of the cutting segments. In a second group of manufacturing methods, the basic material is applied layer-by-layer with a fill shoe and the cutting particles are placed in the basic material by a placing unit in a separate placement step. Because of the separate placement step, it is possible to vary the concentration and distribution of the cutting particles in the material layer and adapt them to the processing task.

Known devices for producing a green compact from a powdered or granular material by successive application and compression of the material are comprised of a fill shoe, which is filled with the material or several materials and is designed to be adjustable by means of an adjusting device, a matrix having at least one construction chamber, which the fill shoe fills layer-by-layer with the material, and a press having a lower punch and an upper punch, which are adjustable by means of a height adjustment device and which compress the material applied layer-by-layer in the construction chamber. A first park position is provided for the fill shoe, in which the fill shoe is disposed during the pressing process. To fill the construction chamber with material, the fill shoe is moved out of the park position into an end position, in which the fill shoe is opened and begins filling the material into the construction chamber. At the end of the filling process, the fill shoe is closed. This position is designated as the second end position for the fill shoe. After the filling process, the fill shoe is moved back out of the second end position over the first end position into the park position.

During the forward movement of the fill shoe between the first and second end positions and during the return movement between the second and first end positions, a one-sided compression of the material is produced on the edge of the construction chamber. The one-sided compression of the material leads to irregularities in the material density. These irregularities may reduce the cutting efficiency and the service life of the cutting segments.

In order to reduce the problem of one-sided compression during the filling process, vibrating the matrix and/or the fill shoe using shaking movements or oscillations during the filling process is known. The shaking movements or oscillations produce a uniform distribution of the material in the construction chamber. However, it is problematic that the cutting particles are likewise distributed uniformly in the material layer and are no longer in the position predetermined by the placing unit in the placement step.

As an alternative, the fill shoe may be moved in different directions of movement over the matrix or over the construction chambers in order to reduce one-sided compression. The problem with this solution is that the movements increase the complexity of the machine and additional machine components are required.

The object of the present invention is further developing a device and a method for producing a green compact from a powdered or granular material by layer-by-layer application and compression of the material to the effect that the cutting segments have a uniform material density without additional machine components. In addition, the required time for constructing the green compacts is reduced.

This object is attained by the device cited at the outset for producing a green compact from a powdered or granular material according to the invention and by the method cited at the outset for producing a green compact from a powdered or granular material according to the invention. Advantageous further developments are disclosed in the dependent claims.

In the case of the device cited at the outset, the invention provides for a second park position to be provided for the fill shoe, wherein the second park position is different from the first park position. Because a second park position is provided for the fill shoe, it is possible to maintain the direction of movement of the fill shoe after the filling process. The fill shoe does not have to be decelerated first and then accelerated in the opposite direction of movement. If the fill shoe were to be moved back into its park position after the filling process, it would also have to cover the distance over the matrix. In addition, the direction of movement in which the material is applied may be reversed in successive material layers without requiring a second fill shoe.

In a preferred embodiment, the fill shoe can be connected in the first and/or second park position to a filling station, which fills the fill shoe with material. The auxiliary process time, during which the fill shoe is disposed in a park position, is utilized to fill the fill shoe with material. Because of the filling station, it is possible to design the fill shoe to be smaller since the fill shoe may be filled regularly with material. If a filling station is not provided for the fill shoe, the fill shoe must be filled with a greater quantity of material or be connected via supply lines to a storage tank. Because of the movement of the fill shoe it is possible for the supply lines to disconnect thereby interfering with or interrupting the supply of material.

It is especially preferred that the fill shoe can be connected to a first filling station in the first park position and to a second filling station in the second park position. Because of the second filling station, it is possible to better utilize the auxiliary process time during which the fill shoe is disposed in a park position.

In a first preferred variant, a first material can be filled at the first filling station and a second material at the second filling station. The filling system is designed to be structurally simpler because only one material is filled at each filling station. Each filling station only has to be connected via one supply line to the storage tank.

In a second preferred variant, a first and second material can be filled at the first and second filling station. The lower the amount of material that must be present in the fill shoe, the smaller and therefore compacter the fill shoe may be. If all materials are able to be filled at both filling stations, it suffices if the fill shoe contains material to apply one material layer.

The speed of the fill shoe is preferably adjustable via the adjusting device. The adjustability of the speed at which the fill shoe moves may be utilized to increase the speed during positioning of the fill shoe as compared to a constant travel speed between the first and second end positions of the filling process. Higher speeds during positioning may reduce the auxiliary process times when constructing the green compacts.

In doing so, the adjusting device of the fill shoe is especially preferably designed as an electric motor. The speed at which the fill shoe is moved over the work surface is adjustable via a control device. In order to reduce the auxiliary process times when constructing the green compacts, the fill shoe is moved at a higher speed than during the filling process from a park position into an end position or from an end position into a park position. The travel speed during the filling process depends above all on the filling behavior of the material.

In the case of the method cited at the outset, the invention provides for the fill shoe to be moved from the second end position into a second park position after application of the material, wherein the second park position is different from the first park position. The positioning path of the fill shoe is reduced, because the fill shoe is moved into the second park position after the filling process. If the fill shoe were to be moved back into its park position after the filling process, it would also have to cover the distance over the matrix.

The material is preferably applied in one material layer in a first direction of movement and in a subsequent further material layer in a second direction of movement, wherein the first and second directions of movement are opposed to one another. Due to the feed movement, a compression zone with increased material density develops during the filling process in the end region of the material layer. The fact that the direction of movement is reversed after every material layer does not compound the errors, but counteracts them.

The speed at which the fill shoe is moved between the park position and the end position is preferably increased at least in sections as compared to a constant speed of the fill shoe between the end positions. Higher speeds during positioning of the fill shoe may reduce the auxiliary process times when constructing the green compacts and therefore the time required to construct the green compacts.

Exemplary embodiments of the invention are described in the following on the basis of the drawings. These drawings are not necessarily supposed to represent the exemplary embodiments to scale; rather the drawings are executed in a schematic and/or slightly distorted form when it is useful for explanatory purposes. Reference is made to the pertinent prior art with respect to additions to the teachings directly identifiable from the drawings. It must be taken into consideration in this case that a wide range of modifications and changes related to the form and detail of an embodiment may be undertaken without deviating from the general idea of the invention. The features of the invention disclosed in the description, the drawings as well as in the claims may be essential for the further development of the invention both separately as well as in any combination. Moreover, all combinations of at least two features disclosed in the description, the drawings and/or the claims fall within the scope of the invention. The general idea of the invention is not restricted to the exact form or detail of the preferred embodiment described and depicted in the following or restricted to a subject matter which would be limited as compared to the subject matter claimed in the claims. In the case of any dimensioning ranges given, values within the stated limits are also meant to be disclosed as limit values, and be applicable at will and claimable. For the sake of simplicity, the same reference numbers are used in the following for identical or similar parts having an identical or similar function.

DETAILED DESCRIPTION OF THE DRAWINGS

Figure 1:
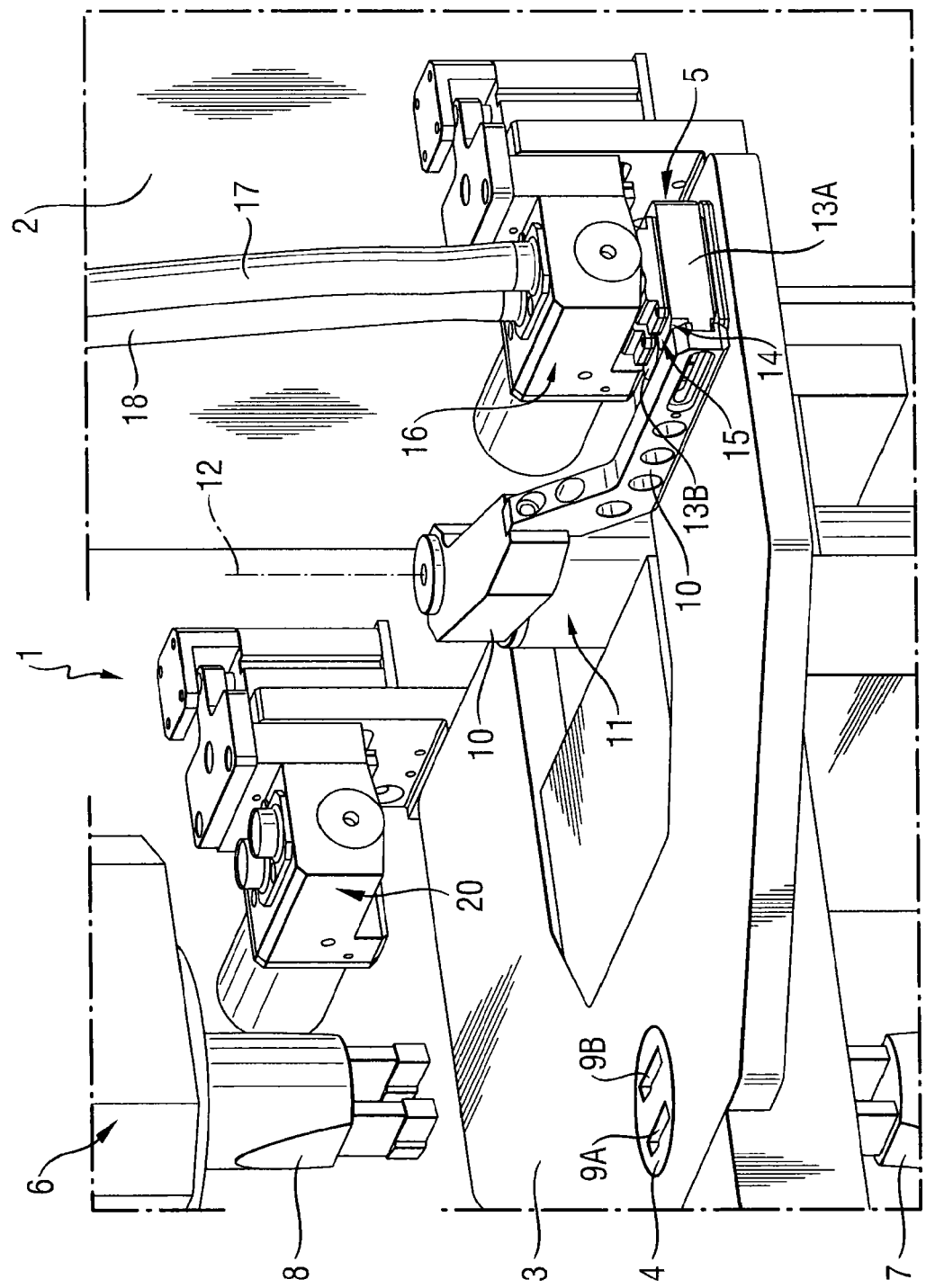
FIG. 1 illustrates a device according to the invention for producing a green compact from a powdered or granular material by successive application of the material with a fill shoe and compression of the material with a press.

FIG. 1 shows a device 1 according to the invention for producing a green compact from a powdered or granular material by successive application and compression of the material. The device 1 includes a machine frame 2, a horizontally disposed work surface 3 having a matrix 4, a fill shoe 5 and a press 6 with a lower punch 7 and an upper punch 8.

The matrix 4 is disposed interchangeably in the work surface 3 and includes a first construction chamber 9A for a first green compact and a second construction chamber 9B for a second green compact. The construction chambers 9A, 9B are designed as passage openings in the matrix 4, in which the lower punch 7 and the upper punch 8 may engage. The construction chambers 9A, 9B are filled with material layer-by-layer during the construction of the green compacts. The geometry of the construction chambers 9A, 9B corresponds to the desired geometry of the cutting segments, wherein shrinkage effects during sintering of the green compacts must be taken into consideration. The construction chambers 9A, 9B shown in FIG. 1 are designed to be identical so that identical cutting segments are produced. Alternatively, the construction chambers may also be designed to be different.

The fill shoe 5 for applying the material in the construction chambers 9A, 9B is arranged above the work surface 3. The fill shoe 5 is fastened on a supporting arm 10 and adjustable on the upper side of the work surface 3 by an adjusting device 11. The adjusting device 11 is designed as a swivel mechanism, which moves the fill shoe 5 around a swivel axis 12. Alternatively, the adjusting device may be designed as a linear drive or as a combined drive unit.

The green compact is constructed from a powdered or granular material in several layers. In this case, the green compact may be constructed of the same material or of different materials. For example, the base zone of a cutting segment, i.e., the area of the cutting segment that is connected to the main body, may be constructed of a weldable material so the cutting segment and the main body are able to be welded together well. The remaining cutting segment is made of a wear material in which the cutting particles are embedded.

The fill shoe 5 includes a first filling container 13A for filling the first construction chamber 9A and a second filling container 13B for filling the second construction chamber 9B. The filling containers 13A, 13B each have two material chambers, a first material chamber for a first material 14 and a second material chamber for a second material 15. The size of the material chambers is selected such that the material chambers are able to accommodate enough material 14, 15 for a predetermined number of material layers. The filling containers 13A, 13B are filled at a filling station 16 with the first and second materials 14, 15. The filling station 16 is connected to a storage tank 19 (FIG. 2) via a first supply line 17 for the first material 14 and via a second supply line 18 for the second material 15. Alternatively, the filling containers 13A, 13B may be connected directly to the storage tank 19 via supply lines.

Along with the filling station 16, the device 1 has a further filling station 20. In the embodiment depicted in FIG. 1, the filling stations 16, 20 are constructed identically. The filling station 20 is connected via supply lines to a storage tank, which stores the first and second materials 14, 15. Alternatively, the first filling station 16 may fill the first material chamber of the filling containers 13A, 13B with the first material 14 and the second filling station 20 may fill the second material chamber of the filling containers 13A, 13B with the second material 15.

Figure 2:
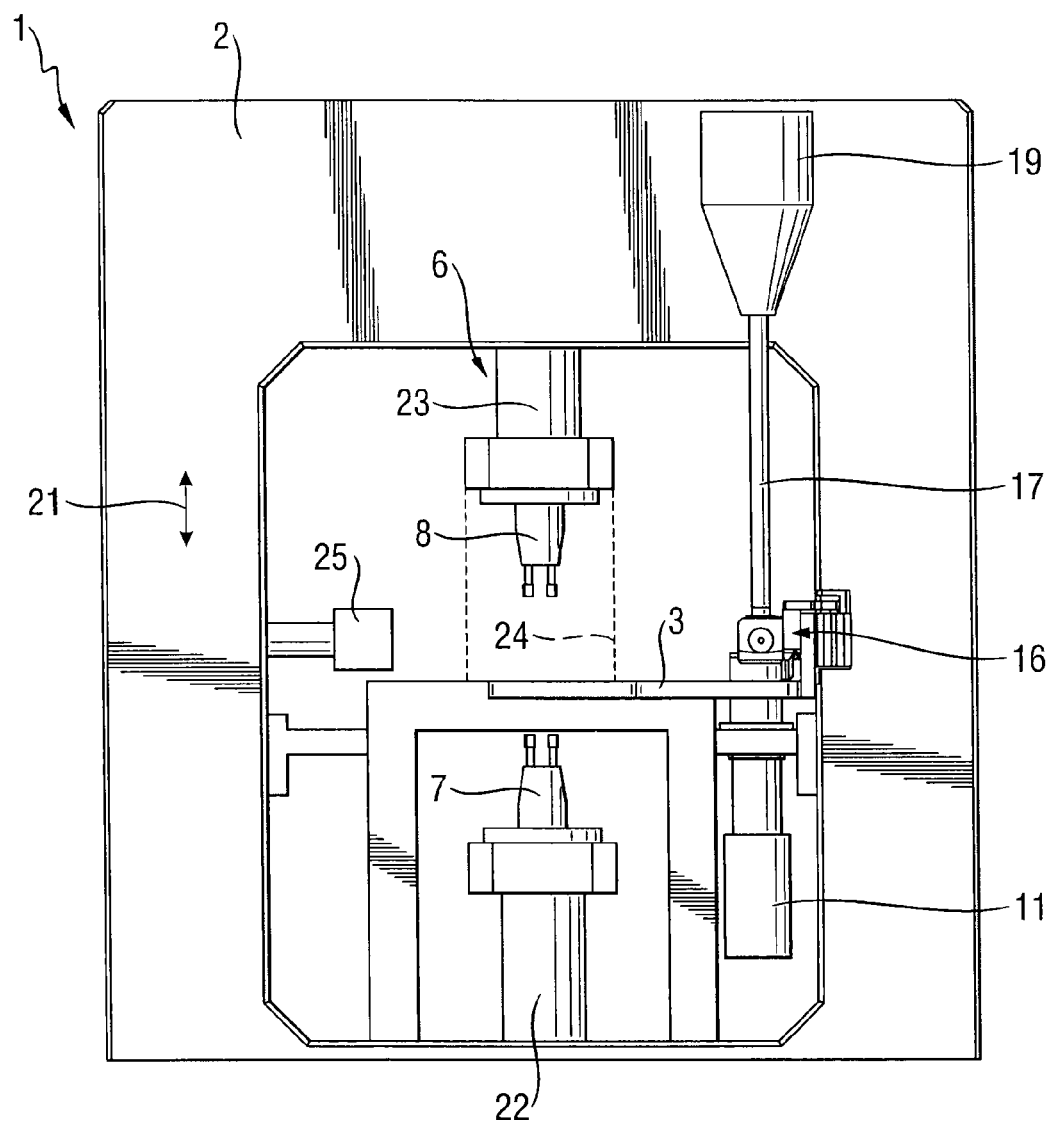
FIG. 2 is a side view of the press from FIG. 1 having a lower punch and an upper punch, which are designed to be height-adjustable and are pressed against each other in a pressing direction.

FIG. 2 shows a side view of the press 6 from FIG. 1 with the lower punch 7 and the upper punch 8. The lower punch 7 is disposed beneath the work surface 3 and connected to the machine frame 2. The upper punch 8 is disposed above the work surface 3 and likewise connected to the machine frame 2.

The lower punch 7 and the upper punch 8 are pressed against each other in a pressing direction 21 in order to compress the green compact. During compression, the cutting particles are temporarily fixed in the material layer and a displacement of the cutting particles in the material layer is prevented. The lower punch 7 is adjustable in a motorized manner with a height adjustment device 22 in the pressing direction 21 and engages in the construction chambers 9A, 9B on the lower side of the matrix 4. The upper punch 8 is adjustable in a motorized manner with a height adjustment device 23 in the pressing direction 21 and engages on the green compact on the upper side of the matrix 4. The area between the lower punch 7 and the upper punch 8 is designated as the press zone 24.

To construct the green compacts, various processing units are required whose movements must be coordinated temporally and spatially. The powdered or granular material 14, 15 is filled by the fill shoe 5 layer-by-layer into the construction chambers 9A, 9B in a first process step, the cutting particles are placed in the material layer with a placing unit 25 in a second process step and the compression of the green compact is carried out with the press 6 in a third process step. In order to prevent the processing units 5, 6, 25 from colliding, the inactive processing units must be removed from the processing zone of the respectively active processing unit. After the filling process, the fill shoe 5 is moved into a position, which lies outside of the press zone 24. Due to the high pressing forces which the upper punch 8 must apply during compression, the upper punch 8 is designed to be solid and the press zone 24 correspondingly large.

Figure 3:
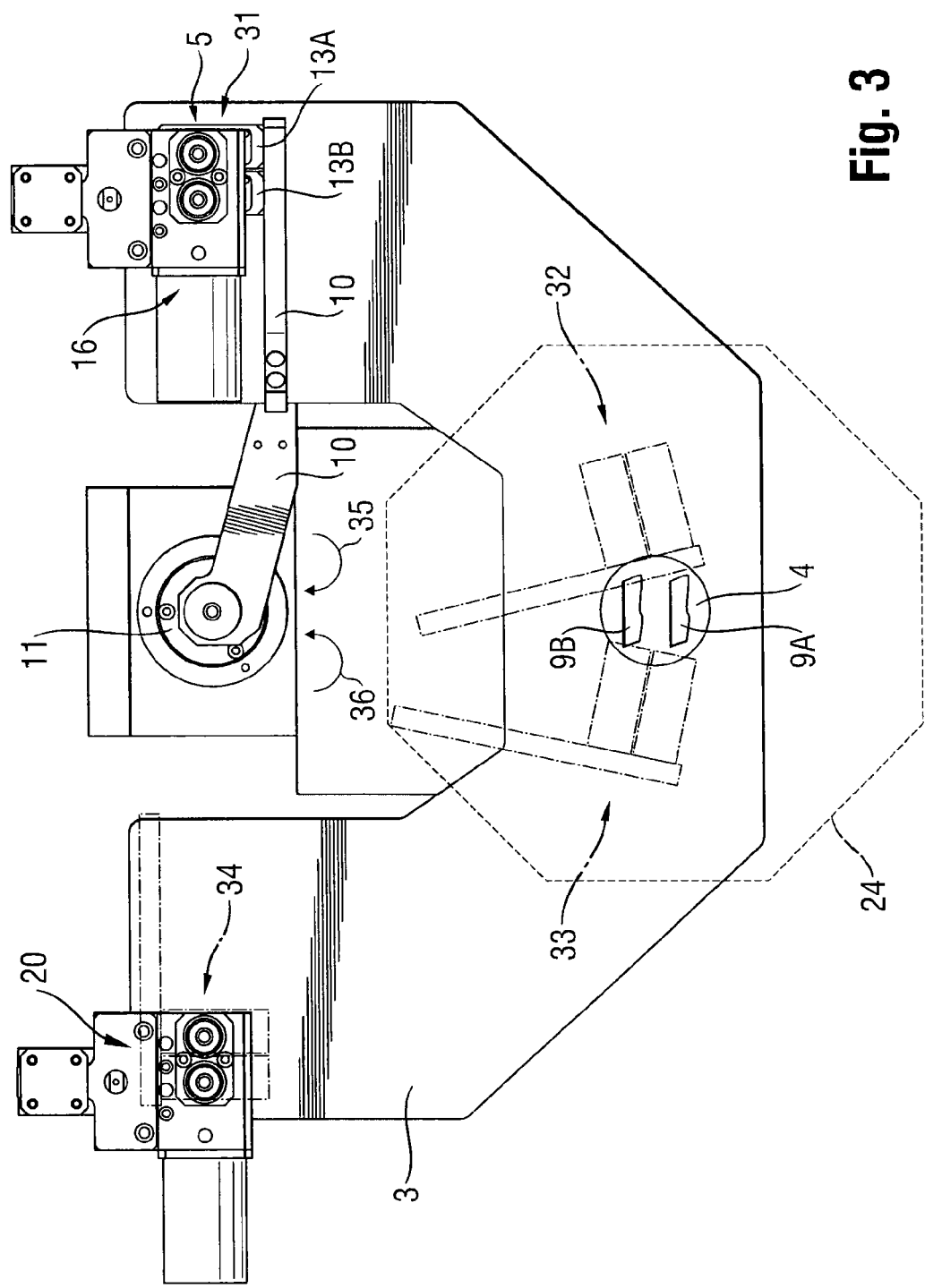
FIG. 3 is a top view of the fill shoe from FIG. 1, wherein the fill shoe is adjustable between a first park position and a second park position.

FIG. 3 shows the fill shoe 5 in a top view onto the work surface 3, wherein the upper punch 8 of the press 6 is not depicted. The fill shoe 5 is disposed in a position that lies outside of the press zone 24 and is designated as the first park position 31. In the first park position 31, the fill shoe 5 is connected to the first filling station 16 and the filling containers 13A, 13B of the fill shoe 5 are able to be filled with the first and second materials 14, 15.

To fill the construction chambers 9A, 9B with the materials 14, 15, the fill shoe 5 is moved out of the first park position 31 into a first end position 32. In the first end position 32, the filling containers 13A, 13B of the fill shoe 5 are opened and the filling process begins. The fill shoe 5 is moved over the construction chambers 9A, 9B, which are filled with the materials 14, 15 via the filling containers 13A, 13B, up to a second end position 33. In the second end position 33, the filling containers 13A, 13B of the fill shoe 5 are closed and the filling process is ended. The fill shoe 5 is moved out of the second end position 33 into a second park position 34. The second park position 34, like the first park position 31, lies outside of the press zone 24. The different positions 31-34 of the fill shoe 5 are preset in a control device or are detected by a sensor device.

The movement of the fill shoe 5 between the first and second park position 31, 34 is subdivided into a positioning movement and a filling movement. Movements that are required to position the fill shoe 5 before and after filling the construction chambers 9A, 9B are designated as positioning movements. In this case, a differentiation is made between an approach movement and return movement. With the approach movement, the fill shoe 5 is moved from a park position into an end position, in which the filling process begins. With the return movement, the fill shoe 5 is moved from an end position, in which the filling process ends, into a park position.

The construction of the green compact using layer-by-layer application and compression is carried out in accordance with the following method according to the invention for producing a green compact from a powdered or granular material. The method is comprised of several phases that are repeated iteratively until the green compact has reached the desired height.

In a first phase, a first material layer is constructed. The first phase is made up of several sub-steps. The lower punch 7 is lowered with the aid of the height adjustment device 22 by the desired layer thickness of the first material layer. If material layers are already located in the construction chambers 9A, 9B, the lower and upper punches 7, 8 are jointly lowered by the desired layer thickness and the upper punch 8 is then moved back into its initial position. The fill shoe 5 is moved in a first direction of movement 35 with an approach movement out of the first park position 31 into the first end position 32. Then the fill shoe 5 is moved over the construction chambers 9A, 9B, which are filled during the filling process with the materials 14, 15, up to a second end position 33. After the filling process, the fill shoe 5 is moved with a return movement in the first direction of movement 35 out of the second end position 33 into second park position 34. Finally, the placing unit 25 places the cutting particles in the first material layer in the desired distribution. The placement step is executed when the cutting particles are not mixed into the material, but are placed individually in the material layer.

After filling the first material layer, the materials are compressed in a second phase. The upper punch 8 is first lowered up to the upper edge of the construction chambers 9A, 9B. Then the lower punch 7 and the upper punch 8 are pressed against each other in pressing direction 21 in order to compress the first material layer. After the compression, the lower punch 7 and the upper punch 8 are jointly lowered in a stroke movement by the desired layer thickness of the second material layer. Then the upper punch 8 is moved back into its initial position.

In a third phase, a second material layer is constructed. The third phase is made up of several sub-steps. The fill shoe 5 is moved in a second direction of movement 36 with an approach movement out of the second park position 34 into the second end position 33. Then the fill shoe 5 is moved over the construction chambers 9A, 9B, which are filled during the filling process with the materials 14, 15, between the second end position 33 and the first end position 32. After the filling process, the fill shoe 5 is moved with a return movement in the second direction of movement 36 out of the first end position 32 into the first park position 31. Finally, the placing unit 25 places the cutting particles in the second material layer in the desired distribution.

In a fourth phase, the second material layer is compressed with the aid of the adjustable lower and upper punches 7, 8 analogous to the compression of the first material layer.

The filling movement and the positioning movements of the fill shoe 5 are carried out during construction of the second material layer in the second direction of movement 36, which is opposed to the first direction of movement 35 when constructing the first material layer. Due to the feed movement of the fill shoe 5, a compression zone with increased material density develops during the filling process in the end region of the material layer. The fact that the direction of movement 35, 36 is reversed after every material layer does not compound the errors, but counteracts them.

The travel speed of the fill shoe 5 is constant during the filling movement between the end positions 32, 33 in order to apply a uniform material application. The filling behavior of the materials 14, 15 establishes the maximum possible travel speed for the filling movement. At higher travel speeds during the filling movement, there is a risk of the construction chambers 9A, 9B not being filled uniformly and above all not with the required material quantity.

With the approach movement and return movement of the fill shoe 5 between the park positions 31, 34 and end positions 32, 33, the maximum possible travel speed of the fill shoe is determined by the capacity of the adjusting device 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for producing a green compact from a powdered or granular material, comprising:
   a fill shoe, wherein the fill shoe is fillable with the powdered or granular material;
   an adjusting device, wherein a position of the fill shoe is adjustable between a first park position and a second park position by the adjusting device and wherein the first park position is different from the second park position;
   a matrix with a construction chamber, wherein the construction chamber is fillable by the fill shoe with the powdered or granular material;
   a press with a lower punch and an upper punch; and
   a height adjustment device, wherein the lower punch and the upper punch are adjustable by the height adjustment device and wherein powdered or granular material in the construction chamber is compressible by the lower punch and the upper punch;
   wherein the fill shoe is disposed in the first park position or the second park position during compression of the powdered or granular material by the lower punch and the upper punch of the press.

2. The device according to claim 1, wherein the fill shoe is connectable in the first park position and/or the second park position to a respective filling station, wherein the fill shoe is fillable with the powdered or granular material by the filling station.

3. The device according to claim 1, wherein the fill shoe is connectable to a first filling station in the first park position and to a second filling station in the second park position.

4. The device according to claim 1, wherein a speed of movement of the fill shoe is adjustable via the adjusting device.

5. The device according to claim 1, wherein the adjusting device is an electric motor.

* * * * *